United States Patent [19]

Chuluda

[11] 4,256,801

[45] Mar. 17, 1981

[54] CARBON FIBER/FLAME-RESISTANT ORGANIC FIBER SHEET AS A FRICTION MATERIAL

[75] Inventor: Philip A. Chuluda, Oxford, Conn.

[73] Assignee: Raybestos-Manhattan, Incorporated, Trumbull, Conn.

[21] Appl. No.: 103,421

[22] Filed: Dec. 14, 1979

[51] Int. Cl.³ .................................................. D04H 1/08
[52] U.S. Cl. ..................... 428/280; 162/146; 162/148; 188/251 A; 192/107 M; 428/281; 428/288; 428/290; 428/297; 428/299; 428/304; 428/320; 428/323; 428/367; 428/402; 428/408; 428/902; 428/920
[58] Field of Search .............. 188/251 A; 192/107 M; 428/280, 281, 288, 290, 297, 299, 301, 323, 367, 402, 408, 304, 320, 283, 902, 920; 162/146, 148

[56] References Cited

U.S. PATENT DOCUMENTS

| | | | |
|---|---|---|---|
| 3,738,901 | 1/1973 | Matsushima et al. | 162/145 |
| 3,778,334 | 12/1973 | Sturgeon et al. | 428/367 |
| 3,793,204 | 2/1974 | Ardary et al. | 428/408 |
| 3,927,241 | 12/1975 | Augustin | 192/107 M |
| 3,932,568 | 1/1976 | Watts et al. | 192/107 M |
| 3,948,363 | 4/1976 | Ely | 192/107 M |
| 3,998,689 | 12/1976 | Kitago et al. | 162/146 |
| 4,020,226 | 4/1977 | Andrianov et al. | 428/290 |
| 4,093,578 | 6/1978 | Vasiliev et al. | 428/408 |

*Primary Examiner*—James J. Bell
*Attorney, Agent, or Firm*—Gordon S. Rogers

[57] ABSTRACT

Paper base friction material in the form of a porous, flexible interfelted fibrous sheet comprised of a mixture of 25 to 65 percent cellulose fibers, 5 to 20 percent carbon fibers, 5 to 20 percent flame-resistant organic fibers, fillers, and an oil resistant elastomeric sizing. The friction material also includes a synthetic resin binder which may be incorporated during preparation of the sheet or subsequently. In use, the paper base friction material is bonded to a supporting member, preferably metal, whereby it is useful as a friction element particularly in oil, such as in automotive automatic transmissions.

21 Claims, No Drawings

CARBON FIBER/FLAME-RESISTANT ORGANIC FIBER SHEET AS A FRICTION MATERIAL

BACKGROUND OF THE INVENTION

The present invention is directed to an improved temperature-resistant, paper base friction material, which when adhesively bonded to a supporting member and used in clutches, bands, brakes, and the like operating in oil, provides a friction element or device having a greater useful life, especially under conditions of high total energy absorption and/or low cooling oil circulation.

Asbestos fibers, by reason of their heat resistance and strength properties, are conventionally used in paper base friction materials for automatic transmission clutch plates and bands, oil brakes and steering clutches operating in a fluid environment. U.S. Pat. No. 3,270,846 discloses such a friction material containing on the order of 5 to 35 percent asbestos fibers. Other similar type paper base friction materials may contain as much as 40–60 percent asbestos fibers.

More recently a paper base friction material which is free of asbestos fibers has been proposed. Thus, according to U.S. Pat. No. 4,045,608, such a paper base friction material comprises a mixture of cellulose fibers, an inorganic absorbent filler and a so-called "retention agent", the sheet being first impregnated with a resin binder followed by an outer coating of an ethyl silicate binder impregnant.

Friction materials of the above-described type, to a large degree, rely upon a porous structure and resiliency to obtain fairly high coefficients of friction in wet friction applications. In those mechanical arrangements providing adequate circulation of cooling oil, the porosity contributes to removal of heat of engagement by allowing penetration of the cooler, external oil into the inner voids of the friction material where it displaces the hotter oil. By so reducing heat build-up at the friction interface, the durability and resistance to fade of the friction material is improved.

Unfortunately, these paper base friction materials, which typically have a porosity of about 60 percent and relatively low heat capacity and thermal conductivity, fail prematurely in conditions of use involving relatively high total energy absorption and/or relatively low cooling oil circulation conditions frequently found, for example, in some multiple disc wet wheel brake and clutch designs.

Friction materials of the foregoing type also are limited as to the degree and type of mating member surface finish against which they are capable of running without substantial loss of durability. Tumbled or ground mating member surface finishes generally no greater than 15 microinch are considered acceptable for low break-in wear and operating wear rates. High density modifications of existing paper base friction materials are capable of running against rougher finishes, but generally have lower dynamic coefficients of friction due to reduced porosity and resiliency.

SUMMARY OF THE INVENTION

It is, therefore, a primary object of this invention to provide an improved, temperature-resistant, paper base friction material, which when bonded to supporting member and used in clutches, bands, brakes, and the like operating in oil, provides a friction element or device having greater useful life, especially under conditions of high total energy absorption and/or low cooling oil circulation.

Another object of this invention is to provide an improved paper base friction material capable of running against mating member surfaces rougher than 15 microinch while maintaining low break-in wear and operating wear rates.

It is a further object of this invention to provide the above-enumerated improvements without sacrificing the several advantages of existing paper base friction materials, such as low cost, high coefficients of friction, low static to dynamic friction ratio, high resistance to fade, resiliency, and the ability to withstand medium unit pressure loadings.

These and other objects of this invention will become apparent from a consideration of this specification and claims.

DESCRIPTION OF THE PREFERRED EMBODIMENTS

According to this invention, it was discovered that paper base friction materials having the above improvements may be obtained by combining carbon fibers with cellulose fibers, flame-resistant organic fibers, certain fillers and an oil resistant elastomeric sizing to form a sheet, and impregnating the sheet with a synthetic thermosetting resin.

More specifically, the paper base friction material of the present invention may be used for wet friction applications heretofore considered to be too severe for existing paper base friction materials, and where the use of more expensive friction materials, such as sintered metal and molded graphite compositions, was required. The improved useful life exhibited by the friction material of the present invention, compared to existing paper base friction materials, especially under conditions of high total energy absorption and/or low cooling oil circulation (where high friction material bulk temperatures may be encountered), makes possible increased service life of wet clutch and brake assemblies by reducing equipment downtime associated with replacing worn out friction plates. At the same time, the friction material of the invention, by reason of its improved durability when subjected to rough mating surfaces, enables the designer to use less expensive finishing operations to produce a mating plate, as compared to those currently used with conventional paper base friction materials.

The essential constituents and their respective proportions for forming the paper base friction material of this invention are set forth in Table I, below:

TABLE I

| Constituent | Weight Percent | |
|---|---|---|
| | General | Preferred |
| Cellulose Fibers | 25–65 | 40–65 |
| Carbon Fibers | 5–20 | 5–15 |
| Flame-Resistant Organic Fibers | 5–20 | 5–15 |
| Graphite | 0–30 | 20–30 |
| Diatomaceous Earth | 0–30 | 5–15 |
| Elastomeric Size | 0–15 (solids) | 5–10 (solids) |

As can be seen by reference to Table I, above, there are present in the friction material of this invention from about 25 to about 65 percent by weight of cellulosic fibers. Typical cellulosic fibers which may be employed include alpha cellulose, sulphite cellulose, sulfate cellulose, cotton, linen, rag and the like.

The carbon fibers used in the friction material of this invention are filamentary forms of carbon having a carbon content generally exceeding about 92 weight percent, and are characterized by flexibility, electrical and thermal conductivity, chemical inertness except to oxidation, and refractoriness. Such fibers are to be contrasted with so-called "graphite fibers" which have the three-dimensional order characteristic of polycrystalline graphite.

The carbon fibers may be of the relatively low strength, low modulus type obtained by carbonizing rayon cloth or felt, of the high strength and high modulus type, which may also be obtained from rayon-based carbon yarns, or of the intermediate modulus, high strength type obtained by carbonizing polyacrylonitrile (PAN)-based yarns. The high modulus, intermediate strength carbon fibers also can be made from a mesophase (liquid crystal) pitch precursor, and those of low strength and low modulus can be made from ordinary (nonmesophase) pitch. Various carbon fibers which may be included in the friction material of this invention are described in detail in the Encyclopedia of Chemical Technology 3d (1978) Vol. 4, pages 622 to 628. Preferred carbon fibers are those obtained from a pitch precursor.

The carbon fibers may range in diameter from about 5 to 20 microns, fibers having a diameter of about 9 to 16 microns being preferred. The length of the carbon fibers may vary considerably. However, fibers having a length of from about 0.4 to 3 millimeters are preferred.

The flame-resistant organic fibers which are an essential component of the friction material of this invention are cross-linked phenolic fibers classified generically as "novoloid" fibers by the Federal Trade Commission. These fibers vary in diameter from about 9 to 35 microns, and their tenacity (g./den.), elongation (%) and modulus (g./den.) depend significantly on fiber diameter, the values decreasing with increasing diameter.

The novoloid fibers, although they tend to degrade slowly in air at 200° C., display very good stability at high temperatures in an inert environment. In the friction material of this invention, the oil displaces the air from the inner voids of the friction material during use, creating an atmosphere whereby the thermal limits of all of the organic constituents, including the phenolic fibers, are increased. The novoloid fibers also exhibit unique flame-resistance in that they resist burning in a flame and provide thermal insulating character superior to other available fibers. A preferred flame-resistant organic fiber for use in the friction material of this invention is a phenolic fiber containing at least 85% by weight of a cross-linked novolac resin. Preferably, such fibers have a diameter of about 30 to 35 microns and a length of from about 0.2 to 2 millimeters.

Present in the friction material of this invention are particulate property modifiers. Thus, the friction material may contain flake graphite to control friction and improve wear, and a mineral, such as diatomaceous earth, which also performs the function of improving dynamic friction and wear resistance at minimum cost.

The flake graphite, as noted in Table I, should comprise up to 30 percent, preferably 20 to 30 percent, by weight, of the friction material. The particle size may vary considerably but generally is smaller than 30 mesh (Tyler Screen Analysis).

The diatomaceous earth may also be present in an amount up to 30 percent, and preferably comprises 5 to 15 percent of the friction material. The particle size of the diatomaceous earth may vary considerably but generally is smaller than 150 mesh (Tyler Screen Analysis).

The friction material may contain small quantities of other property modifiers of the non-abrasive and abrasive types. Examples of the former are cashew friction dusts and ground rubber. The abrasive types include hard materials such as alumina and silicon carbide. Generally such additional modifiers will comprise not more than about 5 percent of the friction material.

The friction material of this invention in sheet form may be produced by conventional water-laid paper-making machines and processes, such as by the use of a Fourdrinier paper-making machine or a rotoformer screen. As is common practice in such procedure, there may be incorporated in the sheet a size which increases the wet strength of the sheet. Preferred sizes are oil resistant elastomeric latexes, such as an acrylonitrile or chloroprene latex, which may be present in an amount up to about 15 percent by weight (on a solids basis) of the sheet. Such latexes are added to the paper-making stock which comprises an aqueous slurry of the fibers and particulate property modifiers. The resultant mixture is the diluted to a solids concentration of 2 to 3 percent which is introduced to the headbox of a standard paper-making machine. The friction material is formed into a sheet on the paper-making machine and dried.

According to a preferred embodiment of this invention, the dry sheet material is cut into suitable blanks, e.g. annular wafers, and saturated with a synthetic thermosetting resin in solvent solution so that following cure, residual resin pick up, based on the initial weight of the sheet of friction material before resin impregnation, results in a sheet having a final porosity of from about 40 to about 55 percent after compression in bonding the sheet material to a supporting member. The thermosetting resin may be a one-step phenol formaldehyde resole type in denatured alcohol, a one-step phenol formaldehyde resole type in water emulsion form, a powdered one-step resole type resin, or a powdered two-step resin composed of novolac resin and hexamethylenetetramine catalyst. Such resins may be cured under specified time/temperature conditions to obtain the desired properties in the friction material. A preferred impregnant is a solution of a one-step phenol-formaldehyde resin in denatured alcohol, a solution containing about 37 percent by weight resin solids being typical. Alternatively, the resin may be incorporated into the sheet by beater addition to the paper stock.

The impregnated blanks are then dried under controlled conditions to remove the major portion, e.g. at least about 85 percent, of the solvent, following which the dried blanks are hung in spaced relation in an air circulating oven where they are heated over a period of about one half hour from ambient temperature to about 350° F., at which temperature they are maintained for a period of time, e.g. about an hour, in order to cure the resin.

The cured blanks, after being removed from the oven and cooled, are subjected to standard finishing steps before the blanks are adhesively bonded under heat and pressure to a supporting member having the desired configuration. The friction material, so bonded, should have a final porosity of about 40 to about 55 percent. There may then be a finish grinding operation, followed by addition of standard grooves to the resulting friction element.

The following are examples of specific embodiments which further describe the paper base friction material of this invention.

EXAMPLE 1

The below-listed constituents in the quantities stated in Table II were processed in a paper-making operation as described hereinbelow:

TABLE II

| Constituent | Parts By Weight |
| --- | --- |
| Cotton Linters (pre-refined) | 40.0 |
| Carbon Fibers (Amorphous) | 5.0 |
| Phenolic Fibers | 5.0 |
| Flake Graphite | 30.0 |
| Diatomaceous Earth | 13.0 |
| Zinc Stearate (Wettable Grade) | 2.0 |
| Nitrile Latex (41.5% solids) | 5.0 (solids) |
| Aluminum Sulfate | 1.2 |

The above composition was prepared by dispersing the cotton linters in water to form a slurry to which the carbon fibers, phenolic fibers, flake graphite, diatomaceous earth, and zinc stearate were added, followed by thorough mixing. The resultant slurry was then diluted with water to 2½ percent solids, and the nitrile latex was added and blended in. A solution of aluminum sulfate in water was also added for final stock preparation, and the stock was introduced to the headbox of a standard Fourdrinier paper-making machine, along with an aqueous solution of a polyelectrolyte retention aid. A paper sheet of the above composition was formed on the machine and dried.

Annular wafers from the dried sheet were then saturated with a 37.5 percent by weight solution of a one-step phenol formaldehyde resin in denatured alcohol, and the wafers were dried under controlled conditions to remove a minimum of 87 percent of the residual alcohol. The pre-cured wafers were hung in spaced relation on rods and placed in an air-circulating oven in which they were heated from ambient temperature to 350° F. over a period of ½ hour, at which temperature they were maintained for an additional hour. The cured wafers, after being removed from the oven and cooled, were subjected to standard finishing steps, including surface grinding, and then adhesively bonded under heat and pressure to both sides of splined metal cores of various configurations. The friction material, as bonded, had a final porosity of about 47 percent. Following a finish grinding operation, standard grooves were mechanically added to both sides of each individual friction member.

EXAMPLE 2

Friction members prepared as described in Example 1 were endurance tested under laboratory conditions on a multiple disc wet wheel brake using an International Harvester Model 1086 agricultural tractor as the test dynamometer.

A modified brake wear test was run using the following schedule:

Phase I: The brake is cycled 100 times at a torque level absorbing 30 percent of the rated power train output (PTO) power in the test brake. The brake shaft speed is set to simulate approximately 3.4 MPH actual ground speed. The brake is run engaged 10 seconds and disengaged 80 seconds. The test should be stopped if the applied pressure required to maintain torque output varies more than 25 percent. After 100 cycles the brake is disassembled and inspected and the friction elements are measured for friction facing wear.

Phase II: The test brake is reinstalled and cycled for an additional 2600 times at a torque level absorbing 45 percent of the rated PTO power. The brake shaft speed and cycle rate are the same as in Phase I. The test should be stopped should the apply pressure required to maintain torque output vary more than 25 percent. After 2600 cycles the brake is disassembled and inspected, and the friction elements are measured for lining wear.

Phase III: If the test brake remains in a usable condition, it is reinstalled for cycling at a torque level absorbing 80 percent of the rated PTO power. The brake shaft speed is increased to simulate approximately 5.8 MPH and the cycle rate is changed so that the brake is engaged 15 seconds and disengaged 75 seconds. This cycle rate and brake horsepower are continued for 2600 cycles, or until brake failure. The brake is disassembled and inspected, and the friction elements are measured for lining wear.

Following the foregoing procedure, the test results obtained are set forth in Table III, below.

TABLE III

| | BTU/In.$^2$/Cycle | Average Wear/Plate | No. Cycles |
| --- | --- | --- | --- |
| Phase I | 0.74 | .0000" | 100 |
| Phase II | 1.11 | .0019" | 2600 |
| Phase III | 2.97 | .0070" | 847 |
| Total | — | .0089" | 3547 |

For purposes of comparison, a commercial type paper base friction material containing asbestos fibers was tested in the same manner and the results obtained are set forth in Table IV:

TABLE IV

| | BTU/In.$^2$/Cycle | Average Wear/Plate | No. Cycles |
| --- | --- | --- | --- |
| Phase I | 0.74 | .0015" | 100 |
| Phase II | 1.11 | .0045" | 2600 |
| Phase III | 2.97 | .0074" | 22 |
| Total | — | .0134" | 2722 |

As can be seen from a comparison of the data in Tables III and IV, the friction material of the present invention has substantially greater endurance than the commercial type, continuing through 847 cycles of Phase III before failure, as compared to only 22 cycles for the commercial type.

In addition the rate of wear of the friction material of the present invention was less than that of the commercial type for each of the three phases of the test described. The friction material of the invention also maintained acceptable torque versus pressure characteristics, indicative of a stable dynamic coefficient of friction. The rate of wear of the friction material of the present invention was approximately forty times less than that of the commercial type during the Phase III high total energy portion of the test, which is a significant improvement.

EXAMPLE 3

A friction element prepared according to Example 1 was durability tested for 2500 cycles on an inertia-type dynamometer, where the friction material is used as a brake to stop the inertia mass of a rotating flywheel, using the following procedure:

TABLE V

| Test Conditions: | |
|---|---|
| Test Facing | 11.25" OD × 8.79" ID |
| Test Surfaces: | One |
| Mating Plate Surface Finish: | 20-35 microinch (Blanchard ground) |
| Flywheel Inertia: | 0.755 slug-ft.$^2$ |
| Oil Type: | Shell Hi Base(Series 3,CD,10W) |
| Oil Temperature: | 180° F. (sump) |
| Oil Flow: | 1 gal./min. |
| Gross Pressure Loading: | 100 psi |
| Engagement Speed: | 1890 RPM (5000 FPM at mean radius) |
| Energy: | 14,600 ft-lbs. |
| Number of Engagements: | 2,500 |

The following type data were recorded, and the recorded data are set forth in Table VI:
1. Dynamic friction from stop time
2. Static friction from "lock-up" torque
3. Lining wear after 100 and 2500 engagements

TABLE VI

| Stop Number | $\mu d$ | $\mu s$ | Stop Number | $\mu d$ | $\mu s$ |
|---|---|---|---|---|---|
| 1 | .155 | .176 | 101 | .147 | .181 |
| 5 | .149 | .176 | 110 | .147 | .178 |
| 10 | .147 | .177 | 250 | .154 | .187 |
| 25 | .144 | .182 | 500 | .159 | .187 |
| 50 | .146 | .185 | 750 | .165 | .187 |
| 100 | .147 | .186 | 1000 | .165 | .186 |
| Incremental Wear at 100th stop - .0010" | | | 1500 | .168 | .183 |
| | | | 2000 | .168 | .182 |
| Incremental Wear at 2500th stop - .0017" | | | 2500 | .162 | .187 |
| Total Wear - .0027" | | | Average | .155 | .183 |

As mentioned previously, high density modifications of existing paper base friction materials offer improved resistance to rough mating member surfaces at the expense of lowering the dynamic coefficient of friction. The present invention, tested as above, having about 47 percent final porosity, was compared to an available standard high density type having a final porosity of about 30 percent. The results for the high density material are set forth in Table VII, below:

TABLE VII

| Stop Number | $\mu d$ | $\mu s$ | Stop Number | $\mu d$ | $\mu s$ |
|---|---|---|---|---|---|
| 1 | .121 | .178 | 101 | .111 | .196 |
| 5 | .100 | .196 | 110 | .096 | .196 |
| 10 | .099 | .196 | 250 | .099 | .197 |
| 25 | .094 | .198 | 500 | .099 | .199 |
| 50 | .094 | .196 | 750 | .099 | .194 |
| 100 | .096 | .197 | 1000 | .106 | .189 |
| Incremental Wear at 100th stop - .0019" | | | 1500 | .113 | .186 |
| | | | 2000 | .113 | .176 |
| Incremental Wear at 2500th stop - .0017" | | | 2500 | .113 | .178 |
| Total Wear - .0036" | | | Average | .098 | .191 |

The friction material of the present invention exhibited about 50 percent less break-in wear than and an operational wear rate equivalent to the more dense standard available type material. Dynamic and static measurements of the coefficients of friction from the above-mentioned durability tests were 0.155 and 0.183 (average) for the friction material of this invention and 0.098 and 0.191 (average) for the more densified baseline material. This combination of high dynamic coefficient of friction and improved durability against rough mating member surfaces is also a significant improvement.

To summarize the advantages of the present invention, in the above-described endurance tests in which performance characteristics of the present paper base friction material and the best available standard commercial paper base friction materials were compared, the latter failed after 22 cycles (Phase III), whereas the present friction material continued through 847 cycles before failure. The rate of wear of the friction material of this invention was 40 times less than the standard type during the high unit energy loading portion of the test, which is a significant improvement.

In the durability tests which have been described (see Example 3), the present friction material, having a final porosity of about 47 percent, exhibited about 50 percent less break-in wear than and a wear rate equivalent to the more densified (30 percent porosity) baseline material. As discussed previously, high density modifications of existing paper base friction materials offer improved resistance to rough mating member surfaces, but only at the expense of lowering the dynamic coefficients of friction. The combination of a high dynamic coefficient of friction and improved durability against rough mating member surfaces also is a significant improvement made possible by the present invention.

I claim:

1. Friction material in porous, flexible, interfelted fibrous sheet form comprising a mixture of from about 25 to about 65 percent cellulose fibers, from about 5 to about 20 percent of carbon fibers, from about 5 to about 20 percent of flame-resistant organic fibers, up to about 30 percent of graphite particles, up to about 30 percent of diatomaceous earth particles, and a small amount of a sizing effective to increase the tensile strength of said sheet, said percentages being by weight based on the total weight of said sheet.

2. A friction material according to claim 1 comprising from about 40 to about 65 percent cellulose fibers, from about 5 to about 15 percent carbon fibers, from about 5 to about 15 percent flame-resistant organic fibers, from about 20 to about 30 percent graphite particles, from about 5 to about 15 percent diatomaceous earth particles, and from about 5 to about 10 percent of sizing solids, said percentages being by weight based on the total weight of said sheet.

3. A friction material according to claim 1 in which said graphite particles are flake graphite particles, and said sizing comprises an oil resistant elastomer.

4. A friction material according to claim 1 in which said flame-resistant organic fibers comprise novoloid fibers.

5. A friction material according to claim 1 in which said sheet is impregnated with an amount of a synthetic thermosetting resin such that said sheet material has a final porosity of from about 40 percent to about 55 percent after compression in bonding said sheet to a supporting member.

6. A friction material according to claim 5 in which said synthetic thermosetting resin comprises a one-step phenol formaldehyde resin.

7. A friction material according to claim 1 in which said carbon fibers have a diameter of from about 5 to 20 microns and a length of from about 0.4 to 3 millimeters, and said flame-resistant organic fibers have a diameter of from about 9 to about 35 microns and a length of from about 0.2 to 2 millimeters.

8. A friction material according to claim 1 comprising about 40 percent cellulose fibers, about 5 percent carbon fibers, about 5 percent flame-resistant organic fibers, about 30 percent graphite, about 13 percent diatomaceous earth and about 5 percent of sizing solids.

9. A friction material according to claim 8 in which said sheet is impregnated with an amount of a synthetic thermosetting resin such that said sheet has a final porosity of about 47 percent after compression in bonding said sheet to a supporting member.

10. A friction material according to claim 9 in which said flame-resistant fibers comprise novoloid fibers and said sizing comprises oil resistant acrylonitrile elastomer.

11. A friction material according to claim 10 in which said resin comprises a one-step phenol formaldehyde resin.

12. A friction element for engaging mechanisms adapted to operate in oil comprising a support member and a friction facing bonded to said support member, said friction facing being in the form of a porous, flexible, interfelted fibrous sheet comprising a mixture of from about 25 to about 65 percent cellulose fibers, from about 5 to about 20 percent of carbon fibers, from about 5 to about 20 percent of flame-resistant organic fibers, up to about 30 percent of graphite particles, up to about 30 percent of diatomaceous earth particles, and a small amount of a sizing effective to increase the tensile strength of said sheet, said percentages being by weight based on the total weight of said sheet, said sheet being impregnated with an amount of a synthetic thermosetting resin such that said sheet has a final porosity of from about 40 percent to about 55 percent after compression in bonding said sheet to said support member.

13. A friction element according to claim 12 in which said sheet comprises from about 40 to about 65 percent cellulose fibers, from about 5 to about 15 percent carbon fibers, from about 5 to about 15 percent flame-resistant organic fibers, from about 20 to about 30 percent graphite particles, and from about 5 to about 10 percent of sizing solids.

14. A friction element according to claim 12 in which said graphite particles are flake graphite particles, and said sizing comprises an oil resistant elastomer.

15. A friction element according to claim 12 in which said flame-resistant organic fibers comprises novoloid fibers.

16. A friction element according to claim 15 in which said synthetic thermosetting resin comprises a one-step phenol formaldehyde resin.

17. A friction element according to claim 12 in which said carbon fibers have a diameter of from about 5 to 20 microns and a length of from about 0.4 to 3 millimeters, and said flame-resistant organic fibers have a diameter of from about 9 to about 35 microns and a length of from about 0.2 to 2 millimeters.

18. A friction element according to claim 12 in which said sheet comprises about 40 percent cellulose fibers, about 5 percent carbon fibers, about 5 percent flame-resistant organic fibers, about 30 percent graphite, about 13 percent diatomaceous earth and about 5 percent of sizing solids.

19. A friction element according to claim 18 in which said sheet is impregnated with an amount of a synthetic thermosetting resin such that said sheet has a final porosity of about 47 percent after compression in bonding said sheet to said support member.

20. A friction element according to claim 19 in which said flame-resistant fibers comprise novoloid fibers and said sizing comprises oil resistant acrylonitrile elastomer.

21. A friction element according to claim 20 in which said resin comprises a one-step phenol formaldehyde resin.

* * * * *